J. F. DE NAVARRO.
ROTARY FURNACE FOR BURNING CEMENT, &c.
No. 11,224. Reissued Feb. 9, 1892.
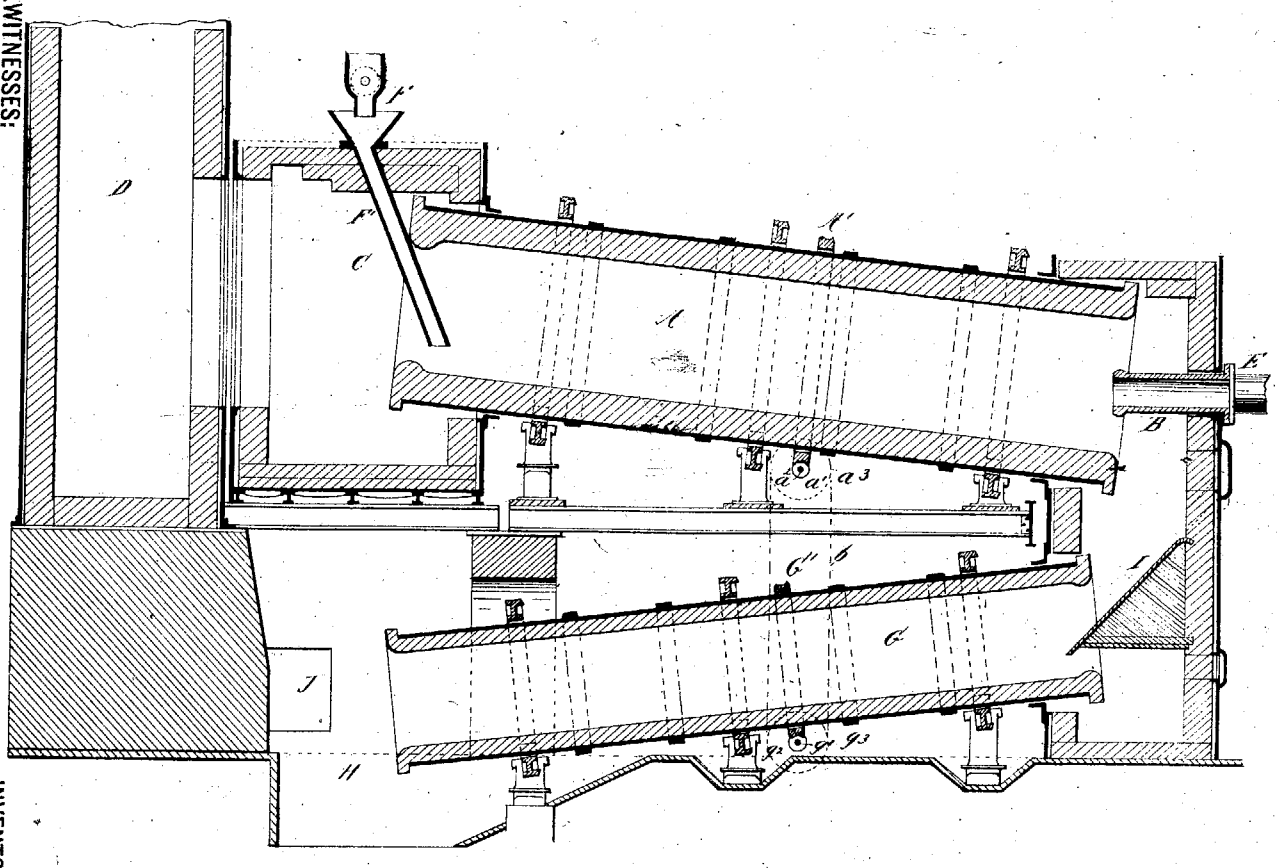
WITNESSES:
Alex Buckler,
T. C. Sedlonzo
INVENTOR
José F. De Navarro
BY
J. N. MacDonald
ATTORNEY

UNITED STATES PATENT OFFICE.

BEST AVAILABLE COPY

JOSE F. DE NAVARRO, OF NEW YORK, N. Y.

ROTARY FURNACE FOR BURNING CEMENT, &c.

SPECIFICATION forming part of Reissued Letters Patent No. 11,224, dated February 9, 1892.

Original No. 464,514, dated December 8, 1891. Application for reissue filed December 22, 1891. Serial No. 415,934.

*To all whom it may concern.*

Be it known that I, JOSE F. DE NAVARRO, a resident of the city and county of New York, in the State of New York, have invented a new and useful Improvement in Rotary Furnaces for Burning or Calcining Cement, Lime, and other Substances, of which the following is a specification, reference being had to the accompanying drawings.

The object of this invention is to utilize the heat contained in the cement, lime, or other calcined material delivered from the furnace for the heating of the air supplied to the furnace for producing combustion and at the same time to effect a gradual cooling of the burned or calcined products by the air so supplied.

The drawing represents a longitudinal vertical section of a furnace illustrating my invention.

A is the main cylinder of the furnace, which may be constructed in the manner common to the cylinders of rotary furnaces of a cylindrical shell of wrought-iron and a fire-brick lining. It is arranged in an inclined position and is open at both ends. It may be supported and rotated upon rollers in the same manner and by the same means as rotary cylinders of furnaces in common use. The lower end of the said cylinder opens into a chamber B and the upper end opens into a stationary chamber C, the fuel-gases for heating the said cylinder being supplied through the said chamber B, and the products of combustion, after passing through the said cylinder, escaping through the chamber C to a chimney D. In the example represented the cylinder is supposed to be heated by the combustion of gases generated outside of the furnace and introduced through the chamber B by a pipe E, which just enters the lower end of the cylinder. At the upper end of the cylinder are a hopper F and a feed-pipe F′ for introducing into the cylinder the material to be burned or calcined.

Directly under the cylinder A, as near as convenient thereto, is arranged another rotary cylinder G, which is open at both ends and may be constructed like the cylinder A, but is preferably smaller. The cylinder G is longitudinally inclined from the cylinder A, the higher end of the said cylinder G being under the lower end of the cylinder A. The upper end of the cylinder G opens into a chamber B. The lower end opens into a chamber H. In the lower part of the chamber B is arranged an inclined chute or conductor I, the lower part of which enters the cylinder G. In the chamber H there are any suitable number of openings J for the entrance of air.

The cylinders A and G may be geared together in any suitable manner to rotate at the same speed or such relative speeds as may be desired. They are represented as furnished, respectively, with worm-gears A′ and G′, which gear, respectively, with endless screws $a'$ and $g'$ on horizontal shafts $a^2$ and $g^2$, the said shafts being furnished, respectively, with pulleys $a^3$ and $g^3$, (shown in dotted outline in the drawing,) and the said pulleys receiving an endless driving-belt $b$. (Shown also in dotted outline.) Rotary motion given to either one of the shafts $a'$ or $g'$ will be communicated to the other and the shafts will drive their respective cylinders.

The operation of the furnace is as follows: Rotary motion being given to the two cylinders A and G, gas being supplied through the pipe E at the lower end of the cylinder A, and air being admitted through the opening J in chamber H, the air passes through the cylinder G to the chamber B, and there meeting the gas ignited from the pipe E combustion is produced, by which the interior of cylinder A is heated to an intense heat. The material to be burned or calcined being then introduced into the upper end of the cylinder A through the hopper F and F′ is caused by the rotary motion of the cylinder and by gravitation to slowly descend the cylinder, wherein as it moves along it is burned or calcined by the intense heat. Reaching the lower end of the cylinder, it falls therefrom onto the chute I, which directs it into the rotary cylinder G. By the rotary motion of the latter and by gravitation it is caused to descend slowly to the outlet at the lower end, whence it falls into a chamber H, from which it is removed in any suitable manner. Passing through the cylinder G, the calcined or burned material is gradually reduced in temperature by the air passing in the opposite direction through the said cylinder, while the air so passing is heated to such a degree that passing up through the chamber B and meeting the gas from the pipe E it promotes a very active and intense combustion of the gas. By causing the air to pass over the heated product in the cylinder G while the said product is kept in motion and every part of which is exposed to the air the material is very effectively cooled, and the waste heat abstracted from it is used to the best effect in heating the air supplied to the furnace.

What I claim as my invention, and desire to secure by Letters Patent, is—

1. The combination, with an inclined rotary furnace-cylinder, of a second rotary cylinder arranged under the said furnace-cylinder and inclined therefrom for the reception and cooling of the burned or calcined products from the said first-mentioned cylinder, substantially as herein set forth.

2. The combination, with the inclined rotary cylinder of a furnace and a chamber at the lower end thereof provided with an opening for fuel-gas, of a second rotary cylinder arranged under and inclined from the first-named cylinder and having its upper end open to said chamber, a conductor to conduct the material from the one cylinder to the other, and means for supplying air to the lower end of the said cylinder to said chamber, substantially as and for the purpose herein set forth.

JOSE F. DE NAVARRO.

Witnesses:
JAMES CLYNE,
I. H. MACDONALD.